(No Model.)
G. L. CRANDAL.
FISHING LINE REEL.
No. 336,092. Patented Feb. 16, 1886.
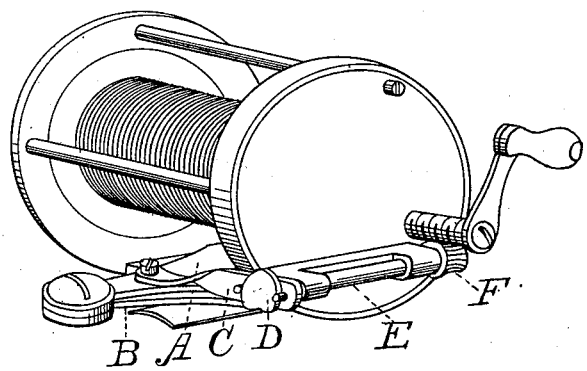
Fig. 1.
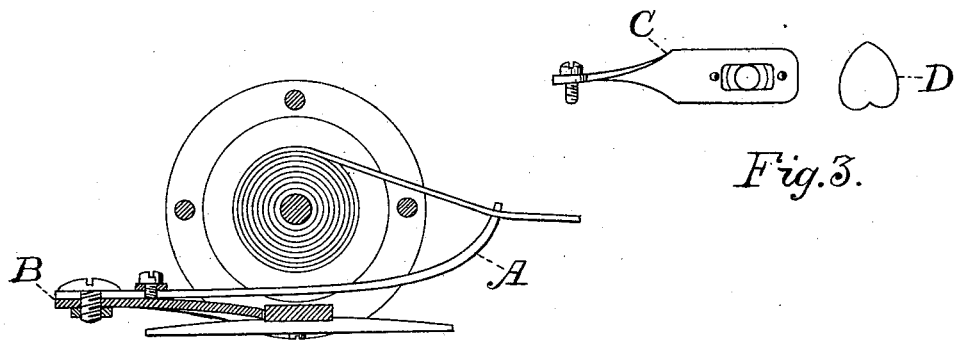
Fig. 2.
Fig. 3.
Witnesses.
Chas. E. Titchener
William F. Donley
Inventor.
Geo. L. Crandal.
By Chas. M. Stone,
Atty.

UNITED STATES PATENT OFFICE.

GEORGE L. CRANDAL, OF BINGHAMTON, NEW YORK.

FISHING-LINE REEL.

SPECIFICATION forming part of Letters Patent No. 336,092, dated February 16, 1886.

Application filed November 9, 1885. Serial No. 182,196. (No model.)

*To all whom it may concern:*

Be it known that I, GEORGE L. CRANDAL, a citizen of the United States, residing at Binghamton, in the county of Broome and State of New York, have invented a new and useful Improvement in Fishing-Line Reels, of which the following is a specification.

The object of my invention is to furnish fishing-line reels with a line-guide which will automatically distribute the line evenly on the reel while the line is being wound on. In a case where no precaution is taken the reel will often become filled up at one place and the line will be unevenly distributed. In this way great trouble and annoyance are caused the angler. Trouble is also caused when a cast is made, by reason of the fact that the reel runs much faster at some parts of the cast than at others, because the line, being unevenly wound, in running out passes over a reel whose diameter is constantly varying. It often happens, while the line is changing from one position on the reel to another position where the diameter is different, that the reel runs faster than the line, and the result is that the line is caught up and the cast is brought to an end. Another trouble also arises from the fact that when the line is being reeled in, unless care is taken, the line frequently becomes bunched up in one place, and soon reaches up to and comes in contact with the cross-bars of the reel. This makes it necessary to partly unwind the line from the reel and commence again on another portion of the reel. All these difficulties are overcome by my invention. A fishing-line reel supplied with my improvement automatically winds the line evenly on the reel. This is accomplished by means of a swinging arm, A, Figs. 1 and 2, pivoted to a supporting-arm, B, which is attached to the bed-plate or reel-frame. The said swinging arm A, after passing under the reel, is bent up in front of it and carries an eye or loop at the end, through which the line runs. The said swinging arm A is moved uniformly forward and back in front of the reel by means of a connecting-bar, C, pivoted to it, and which engages with a reciprocating cam, D. The cam D is secured to a shaft, E, which is driven by a worm-wheel, F, actuated by a worm on the crank-shaft of the reel.

Figure 1 represents my invention attached to a common fishing-reel. Fig. 2 represents a sectional view, and shows the swinging arm its entire length. Fig. 3 represents the connecting-bar C and cam D.

It is evident, when the line is being reeled in, that the swinging arm A will carry the line back and forth with it, and in this way the line will be wound evenly on the reel.

What I claim as my invention, and desire to secure by Letters Patent, is—

1. A fishing-line reel, in combination with the swinging arm A, connecting-bar C, reciprocating cam D, and worm and worm-wheel F, substantially as shown and described.

2. A fishing-line reel, in combination with the swinging arm A and supporting-arm B, substantially as shown and described.

GEO. L. CRANDAL.

Witnesses:
CHAS. E. TITCHENER,
WILLIAM F. DONLEY.